United States Patent
Yadav et al.

(12)

(10) Patent No.: US 12,013,767 B2
(45) Date of Patent: Jun. 18, 2024

(54) SMART RESTORATION FOR UNAVAILABLE DATA USING META-DATA

(71) Applicant: Dell Products L.P., Round Rock, TX (US)

(72) Inventors: Sunil Yadav, Bangalore (IN); Aaditya Rakesh Bansal, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 133 days.

(21) Appl. No.: 17/957,425

(22) Filed: Sep. 30, 2022

(65) Prior Publication Data

US 2024/0111637 A1   Apr. 4, 2024

(51) Int. Cl.
*G06F 11/14* (2006.01)

(52) U.S. Cl.
CPC ...... *G06F 11/1469* (2013.01); *G06F 2201/84* (2013.01)

(58) Field of Classification Search
None
See application file for complete search history.

*Primary Examiner* — Eddy Cheung
(74) *Attorney, Agent, or Firm* — Chamberlain, Hrdlicka, White, Williams & Aughtry; Aly Z. Dossa

(57) ABSTRACT

Embodiments of the invention relate to methods and systems that improve the operation of one or more computing devices by allowing backups and restorations to be performed on files and folders that are normally unavailable for normal restoration. By utilizing the backup's meta-data, a backup agent can receive an indication that a file or folder is not available and take appropriate actions so that the files and folders that are normally not available can be properly restored. Making it possible to efficiently perform a backup of a file-system that can be restored even when files and/or folders are normally unavailable to be restored normally.

20 Claims, 4 Drawing Sheets

SMART RESTORATION FOR UNAVAILABLE DATA USING META-DATA

BACKGROUND

As people increasingly rely on computing systems and devices to perform a plethora of tasks; the systems have become increasingly complex, and the opportunities for failure and/or loss of important data has also increased. Frequently, backups of assets including important files and folders associated with an application or file-system are required. However, during restoration files and folders may be unable to be restored due to restrictions on a backup agent performing the restoration or a target file system. Presently there is no simple method for restoring these files and folders.

SUMMARY

In general, certain embodiments described herein relate to a method for performing a backup and a restoration. The method comprises of receiving a request for a backup and performing the backup. Once the backup is performed, the meta-data for each file and folders is stored. If the file or folder meets a predetermined criteria that would make the file or folder unavailable for normal restoration, an indication is added to the meta-data for that file or folder. When a request for restoration is later received, those files and folders that are not indicated as meeting the predetermined criteria are restored to their original location, while those that do have the indication, are placed in a separate folder different then their original location. Instructions are then received, which specify how to restore those files and folders that have the indication and have been placed in the separate folder. The files and folders are then restored in accordance with the received instructions.

In general, certain embodiments described herein relate to a non-transitory computer readable medium comprising computer readable program code, which when executed by a computer processor enables the computer processor to perform a method for performing a backup and a restoration. The method comprises of receiving a request for a backup and performing the backup. Once the backup is performed, the meta-data for each file and folders is stored. If the file or folder meets a predetermined criteria that would make the file or folder unavailable for normal restoration, an indication is added to the meta-data for that file or folder. When a request for restoration is later received, those files and folders that are not indicated as meeting the predetermined criteria are restored to their original location, while those that do have the indication, are placed in a separate folder different then their original location. Instructions are then received, which specify how to restore those files and folders that have the indication and have been placed in the separate folder. The files and folders are then restored in accordance with the received instructions.

In general, certain embodiments described herein relate to a system comprising: a production host that includes, a file-system, a processor, and a memory. The memory includes instructions, which when executed by the processor, perform a method for performing a backup and a restoration. The method comprises of receiving a request for a backup and performing the backup. Once the backup is performed, the meta-data for each file and folders is stored. If the file or folder meets a predetermined criteria that would make the file or folder unavailable for normal restoration, an indication is added to the meta-data for that file or folder. When a request for restoration is later received, those files and folders that are not indicated as meeting the predetermined criteria are restored to their original location, while those that do have the indication, are placed in a separate folder different then their original location. Instructions are then received, which specify how to restore those files and folders that have the indication and have been placed in the separate folder. The files and folders are then restored in accordance with the received instructions.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1A:
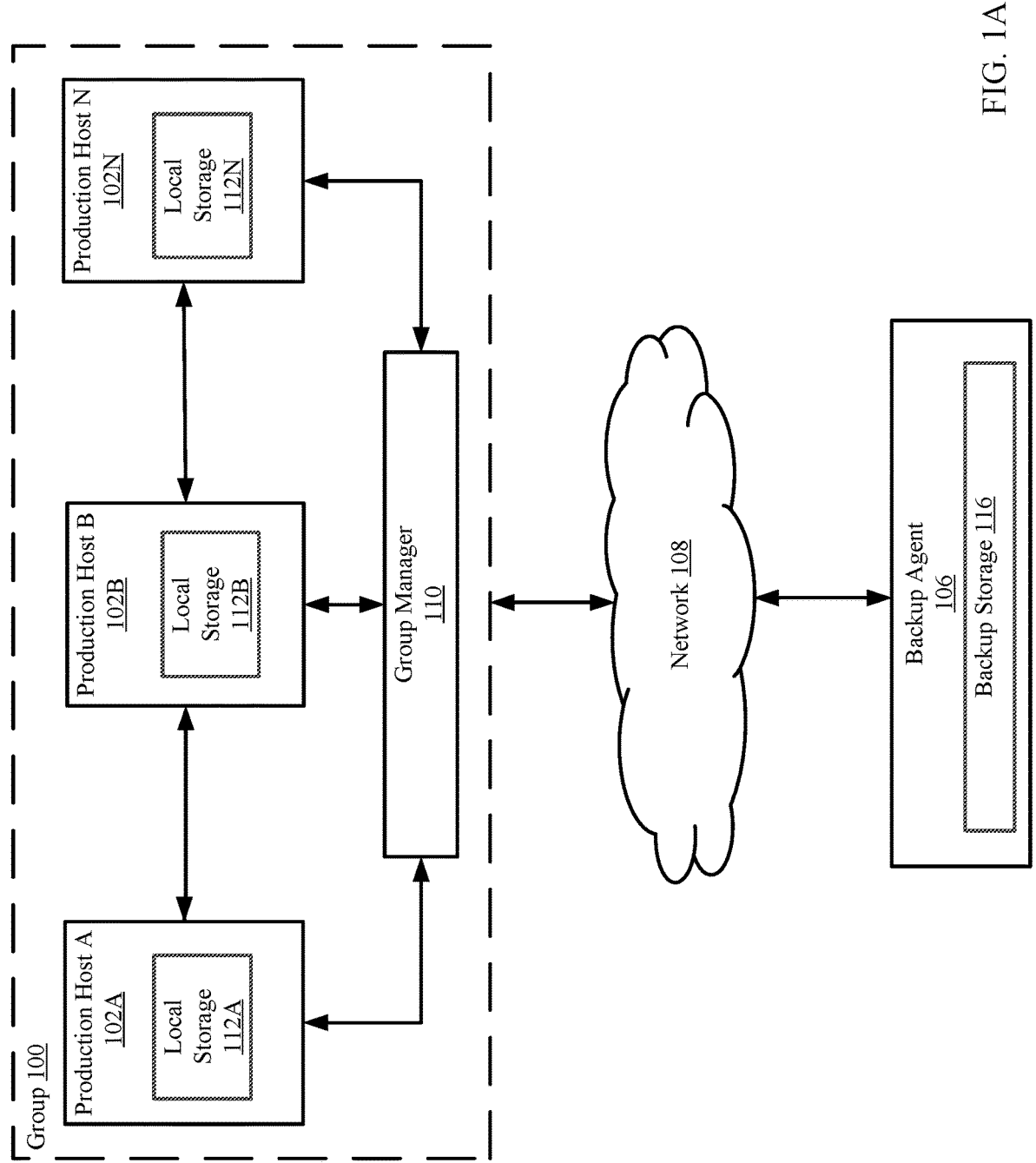
FIG. 1A shows a diagram of a system in accordance with one or more embodiments of the invention.

In the following description of the figures, any component described with regards to a figure, in various embodiments of the invention, may be equivalent to one or more like-named components described with regards to any other figure. For brevity, descriptions of these components will not be repeated with regards to each figure. Thus, every embodiment of the components of each figure is incorporated by reference and assumed to be optionally present within every other figure having one or more like-named components. Additionally, in accordance with various embodiments of the invention, any descriptions of the components of a figure are to be interpreted as an optional embodiment, which may be implemented in addition to, in conjunction with, or in place of the embodiments described with regards to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase "operatively connected," or "operative connection," means that there exists between elements/components/devices a direct or indirect connection that allows the elements to interact with one another in some way. For example, the phrase "operatively connected" may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In many traditional data protection and management solutions for client/server architectures, some files and/or folders are not accessible by other clients/servers for a plethora of reasons. While this may not be an issue during day-to-day operations, when there is a need to perform a data protection event such as a backup or restoration, this may cause issues, since the backup agent, new production host, or new file-system may not be able recognize or properly interact with those files and/or folders that are not accessible. Also, when a restoration of a backup is needed in the future, files and folders that were previously accessible, may no longer be accessible due to changes in technology.

In accordance with one or more embodiments of the invention, meta-data produced during a backup is modified to include an indication for any files and/or folders that are not accessible. When it becomes time to perform a restoration, those files and/or folders that are indicated as not being accessible may be restored to a special folder. Then based on predetermined instructions or instructions received from a user or administrator, the indicated files and/or folders may be restored as instructed or skipped over as desired. This allows backups and restorations to be performed even for files and folders that may not be directly accessible by the backup-agent or by other components of the client/server architecture.

The following describes various embodiments of the invention.

FIG. 1A shows a diagram of a system in accordance with one or more embodiments of the invention. The system includes a group (100) that includes a plurality of hosts (e.g., 102A-102N) and a group manager (110). The system may include any number of hosts (e.g., 102A-102N) and groups (e.g., 100) without departing from the invention. For example, the system may include six hosts configured as two groups (not shown) that communicate through a network (108). The system also includes a backup agent (106) which may perform backups of assets located on any of the production hosts (e.g., 102A-102N). The system may include additional, fewer, and/or other components without departing from the invention. Each of the components in the system may be operatively connected via any combination of wireless and/or wired networks (108). Each component illustrated in FIG. 1A is discussed below.

In one or more embodiments of the invention, the group (100) interacts via a network (108) with one or more backup agents (e.g., 106). The backup agent (106) may be a separate computing system that coordinates backups and includes, in one or more embodiments of the invention, storage (e.g., 116) for storing a completed backup and other data. Alternatively, or in addition to, in one or more embodiments of the invention, the backup agents may be parts of the group manager (e.g., 110) or one or more production hosts (e.g., 102A-102N). Other configurations of the backup agents (e.g., 106) and the group (e.g., 100) may be utilized without departing from the invention.

In one or more embodiments of the invention, the backup agent (106) may generate and provide to the backup storage device (116) the backups and the historical meta-data based on backup policies implemented by the backup agent (106). The backup policies may specify a schedule in which assets associated with the production hosts (e.g., 102A-102N) are to be backed up. The backup agent (106) may be triggered to generate a backup along with backup meta-data and provide the backup and its meta-data to the backup storage device (116) in response to a backup policy. Alternatively, backup, and backup meta-data may be generated by the backup agent (106) and provided to the backup storage device (116) in response to a backup request triggered by a client (not-shown) or user of the system. The backup meta-data and backup data stored in the backup storage (116) may then be restored as described in the method shown in FIG. 2.

In one or more embodiments of the invention, the backup agent (106) may periodically or in response to receiving a request for a backup, perform a meta-data-based backup (MBB) of one or more file systems associated with the production hosts (e.g., 102A-102N). When performing an MBB, the backup agent (106) or equivalent component of the system, gathers the meta-data for all the files and folders of the file-systems associated with the production hosts (e.g., 102A-102N). This meta-data is then saved to each of the local storages (e.g., 112A-112N) of the production hosts (e.g., 102A-102N) for use in future backups as well as for other functions. Alternatively, the meta-data gathered during the MBB may be stored in backup storage (116) or in the group manager (110) or other storage that is part of the group (e.g., 100) or connected to the group (e.g., 100) via the network (e.g., 108).

In one or more embodiments of the invention, the backup agent (106) includes its own storage (116). The backup storage (116) may store data and/or files such as backup data and meta data, as well as definitions rules, procedures, and other pertinent information for performing backups of the production hosts (e.g., 102A-102N). The backup agent's storage (116) may include one or more processors, memory (e.g., random access memory), and persistent storage (e.g., disk drives, solid state drives, etc.). In one or more embodiments of the invention, the backup agent's storage (116) as well as the backup agent (106) itself, may also, or alternatively, comprise of off-site storage including but not limited to, cloud base storage, and long-term storage such as tape drives, depending on the particular needs of the user and/or the system.

In one or more embodiments of the invention, the backup agent (106) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the backup agent (106) described throughout this application.

Figure 3:
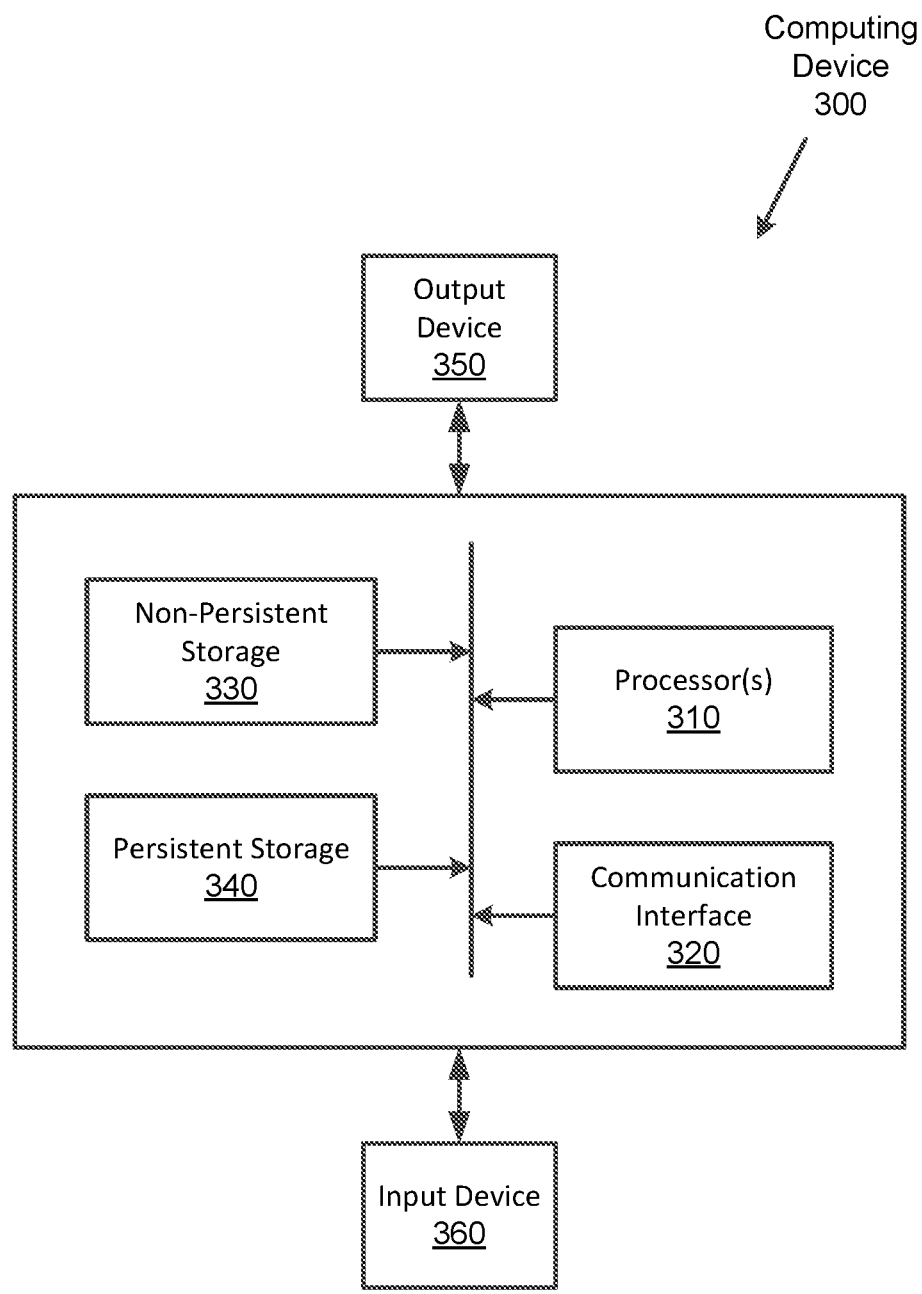
FIG. 3 shows a diagram of a computing device in accordance with one or more embodiments of the invention.

In one or more embodiments of the invention, the backup agent (106) is implemented as a computing device (see e.g., FIG. 3). A computing device may be, for example, a mobile phone, tablet computer, laptop computer, desktop computer, server, distributed computing system, or cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device cause the computing device to perform the functionality of a backup agent (e.g., 106) described throughout this application.

In one or more embodiments of the invention, the backup agent (106) is implemented as computer instructions, e.g., computer code, stored on a persistent storage that when executed by a processor of the production hosts (e.g., 102A-102N) causes the production hosts (e.g., 102A-102N) to provide the functionality of the backup agents (106) described throughout this application. Alternatively, in one or more embodiments of the invention the backup agent (106) may be implemented by the group manager (e.g., 110), a client (not shown) or other component of the system, which may provide the functionality of the backup agent (106) described through this application.

In one or more embodiments of the invention, the group (100) of hosts (e.g., 102A-102N), group manager (110), and the backup agent (106) communicate through a network (108). The network (108) may take any form including any combination of wireless and/or wired networks. The network (108) may be a local network (LAN) or a wide area network (WLAN) including the Internet or a private enterprise network that connects more than one location. The network (108) may be any combination of the above networks, other known network, or any combination of network types.

In one or more embodiments of the invention, the network (108) allows the group (100) to communicate with other groups (not shown) and external computing devices such as (but not limited to) a client and/or a backup agent (e.g., 106). The various components of the group (100) may also communicate with each other through a network. The network may be a high-speed internal network and/or include part of an external network (e.g., 108). The production hosts (e.g., 102A-102N), and group manager (e.g., 110) communicate with each other over the internal network and in one or more embodiments of the invention provide fallback functionality.

A network (e.g., 108) may refer to an entire network or any portion thereof (e.g., a logical portion of the devices within a topology of devices). A network may include a data center network, a wide area network, a local area network, a wireless network, a cellular phone network, and/or any other suitable network that facilitates the exchange of information from one part of the network to another. A network may be located at a single physical location or be distributed at any number of physical sites. In one or more embodiments, a network may be coupled with or overlap, at least in part, with the Internet.

In one or more embodiments, although shown separately in FIG. 1A, the network (108) may include any number of devices within any components (e.g., 100, 102A-102N, 106, and 110) of the system, as well as devices external to, or between, such components of the system. In one or more embodiments, at least a portion of such devices are network devices (not shown). In one or more embodiments, a network device is a device that includes and/or is operatively connected to persistent storage (not shown), memory (e.g., random access memory (RAM)) (not shown), one or more processor(s) (e.g., integrated circuits) (not shown), and at least two physical network interfaces, which may provide connections (i.e., links) to other devices (e.g., computing devices, other network devices, etc.). In one or more embodiments, a network device also includes any number of additional components (not shown), such as, for example, network chips, field programmable gate arrays (FPGAs), application specific integrated circuits (ASICs), indicator lights (not shown), fans (not shown), etc. A network device may include any other components without departing from the invention. Examples of a network device include, but are not limited to, a network switch, a router, a multilayer switch, a fibre channel device, an InfiniBand® device, etc. A network device is not limited to the aforementioned specific examples.

Figure 2:
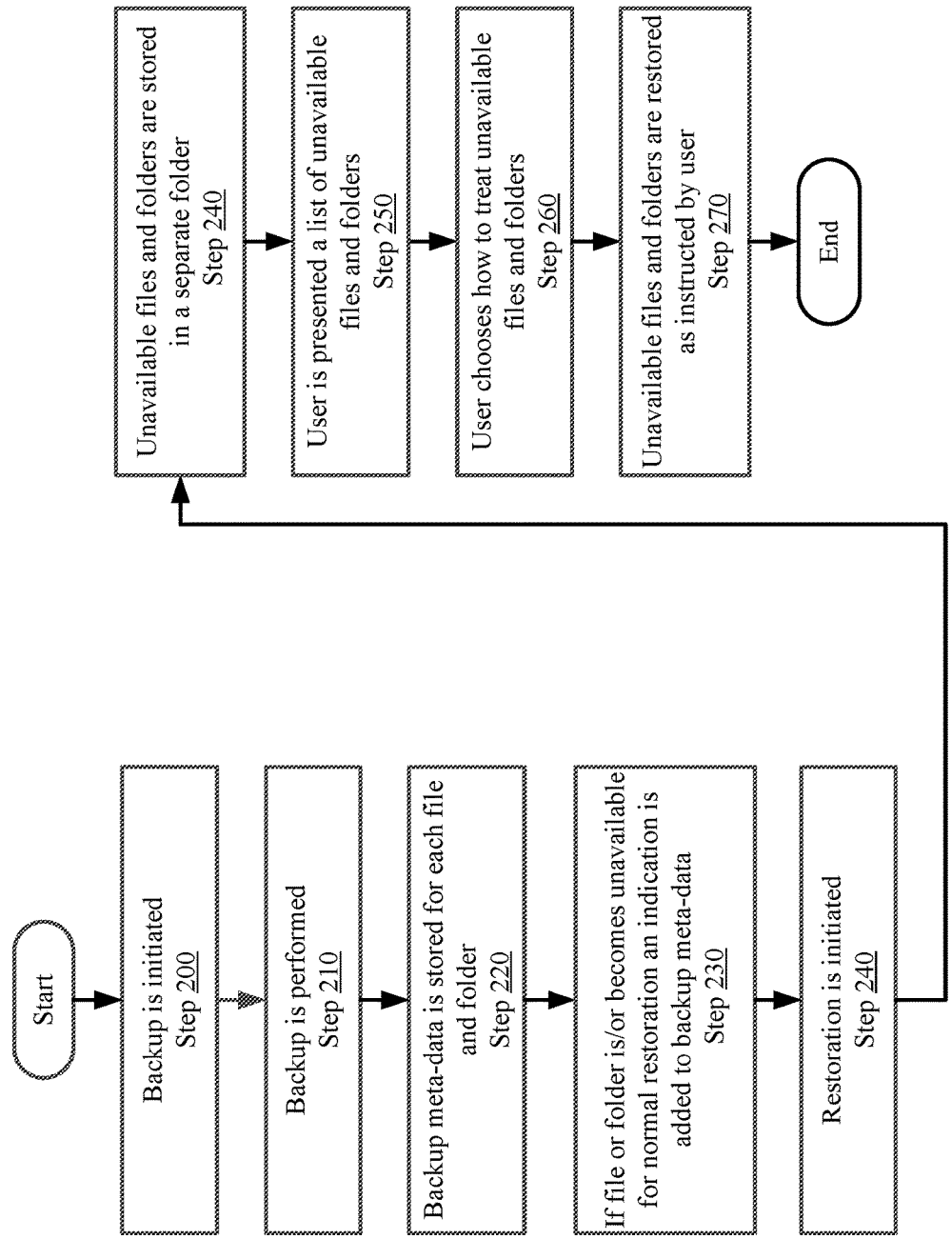
FIG. 2 shows a flowchart of a method of performing a backup and restoration of files and folders in accordance with one or more embodiments of the invention.

In one or more embodiments, network devices are configured to participate in one or more network protocols, which may include methods for backing up and restoring such as the methods described in FIG. 2.

In one or more embodiments of the invention, a group (e.g., 100) may be implemented as one or more computing devices. A group (e.g., 100) may include any number of computing devices without departing from the invention. The group may include different computing devices, different quantity, and types of computer resources, and may perform different computer implemented services without departing from the invention.

In one or more embodiments of the invention, the group (100) includes a plurality of production hosts (e.g., 102A-102N) which include the functionality to obtain data protection services from the data protection manager (not shown) and/or the group manager (e.g., 110). While shown as containing only three production hosts (e.g., 102A-102N), the group (100) may include more or less production hosts without departing from the invention, for example a group (e.g., 100) may comprise of at least sixteen production hosts, at least fifty production hosts, or at least a hundred production hosts without departing from the invention.

Each host (e.g., 102A-102N) includes local storage (e.g., 112A-112N) for storing assets such as files and folders which may be made available to other hosts requesting target devices (e.g., 106). The local storage (e.g., 112A-112N) may include one or more processors, memory (e.g., random access memory), and persistent storage (e.g., disk drives, solid state drives, etc.). In one or more embodiments of the invention, the local storage (e.g., 112A-112N) may also or alternatively comprise of off-site storage including but not limited to, cloud base storage, and long-term storage such as tape drives, depending on the particular needs of the user and/or the system. The group may also contain shared storage including at least one group shared volume (CSV) (not shown) which is active with each of the production hosts (e.g., 102A-102N) of the group (100). Other types of shared storage may also or alternatively be included such as active-passive storage and local storage (e.g., 112A-112N).

In one or more embodiments of the invention, the production hosts (e.g., 102A-102N) perform workloads and provide services to clients and/or other entities not shown in the system illustrated in FIG. 1A. The production hosts (e.g., 102A-102N) may further include the functionality to perform computer implemented services for users (e.g., clients) of the group (100). The computer implemented services may include, for example, database services, electronic mail services, data processing services, etc. The computer implemented services may include other and/or additional types of services without departing from the invention.

During the performance of the aforementioned services, data may be generated and/or otherwise obtained. The production hosts (e.g., 102A-102N) include local storage (e.g., 112A-112N) which may include multiple volumes, as well as shared storage which may include group shared volumes (e.g., CSVs). The various data storage volumes (e.g., 112A-112C) performing data storage services may include storing, modifying, obtaining, and/or deleting data. The data storage services may include other and/or additional services without departing from the invention. The data generated and stored on the local storage (e.g., 112A-112N) by the production hosts (e.g., 102A-102N) may be valuable to users of the system, and therefore may be protected by the backup agent (106). The production hosts (e.g., 102A-102N), alternatively or in addition to the backup agent (106) may provide backup storage services and include backup storage on the local storage (e.g., 112A-112N). The backup storage services may include storing backups of data stored on the shared storages for restoration purposes. The backup storage services may include other and/or additional services without departing from the invention.

The production hosts (e.g., 102A-102N) may include a primary production host (e.g., 102A) and secondary production hosts (e.g., 102B and 102N). The specific configuration of which production host is the primary production host and which production host is the secondary production host may be preconfigured or may be automatically managed by the group manager (e.g., 110). The production hosts (e.g., 102A-102N) may include any number of secondary production hosts without departing from the invention. Alternatively, all production hosts (e.g., 102A-102N) may be secondary production hosts with the group manager (e.g., 110) performing the additional tasks of the primary host.

The production hosts (e.g., 102A-102N), may be operably connected to one or more group shared storages and may obtain data storage services from the one or more group shared storages. The production hosts (e.g., 102A-102N) may be operably connected to each other, and each production host (e.g., 102A) may include the ability to use all or part of the volumes, including shared active-passive drives that form the local storage (e.g., 112A-112N) of the other production hosts (e.g., 102B and 102C).

In one or more embodiments of the invention, the production hosts (e.g., 102A-102N) are implemented as computing devices (see e.g., FIG. 3). A computing device may be, for example, a mobile phone, tablet computer, laptop computer, desktop computer, server, distributed computing system, or cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the production hosts (e.g., 102A-102N) described throughout this application.

In one or more embodiments of the invention, the production hosts (e.g., 102A-102N) are implemented as logical devices. The logical devices may utilize the computing resources of any number of computing devices and thereby provide the functionality of the production hosts (e.g., 102A-102N) described throughout this application.

The production hosts (e.g., 102A-102N) as well as other components of the group and connected devices may perform data storage services. The data storage services may include storing, modifying, obtaining, and/or deleting data stored on the local and shared storages (e.g., 112A-112N) based on instructions and/or data obtained from the production hosts (e.g., 102A-102N) or other components of the group (e.g., 100). The data storage services may include other and/or additional services without departing from the invention. The local storages (e.g., 112A-112N) may include any number of storage volumes without departing from the invention.

The local and shared storages (e.g., 112A-112N) may include storage devices (not shown) for storing data. The storage devices may be physical storage devices and/or logical storage devices. The physical storage devices may include any combination of hard disk drives, solid state disk drives, tape drives, and/or any other physical storage mediums for the storage of data.

The logical storage devices (e.g., virtualized storage) may utilize any quantity of hardware storage resources of any number of computing devices for storing data. For example, the local and shared storages (e.g., 112A-11N) may utilize portions of any combination of hard disk drives, solid state disk drives, tape drives, and/or any other physical storage medium of any number of computing devices.

In one or more embodiments of the invention, the production hosts (e.g., 102A-102N) as well as the associated local storages (e.g., 112A-112N) are managed by a group manager (e.g., 110). The group manager (110) performs a plurality of functions not limited to managing and configuring the services provided by the production hosts (e.g., 102A-102N), managing the mapping and movement of data on the at least the associated local storage devices (e.g., 112A-112N). The group manager (110) may perform other functions attributed to other components of the system or function not described herein without departing from the invention.

In one or more embodiments of the invention the group manager (110) includes the functionality to perform a portion, or all of, the data protection services of the data protection manager (not shown). This may include performing discovery of the volumes and assets associated with the production hosts (e.g., 102A-102N) including those stored on the local storage (e.g., 112A-112N). This may also include performing, or initiate backups and restorations as well as other functions of the backup agent (e.g., 106) including those of the method described below with regards to the method shown in FIG. 2. The group manager (110) may include the functionality to perform and or obtain other and/or additional services without departing from the invention.

In one or more embodiments of the invention, the group manager (110) may perform discovery on the volumes and assets comprising of files and folders associated with the production hosts (e.g., 102A-102N) including those stored on the local storage (e.g., 112A-112N). The group manager queries each production host (e.g., 102A-102N) and their associated local storage (e.g., 112A-112N). Using the results of the query, the group manager (110) produces a file and folder mapping, which is stored as file system meta-data on each of the production hosts (e.g., 102A-102N). This allows for each of the production hosts (e.g., 102A-102N) to know where a given file and/or folder is located at any given time. By updating the discovery periodically, such as, but not limited to, every fifteen seconds, the mapping may remain accurate and provide quicker access times with less or no inter-host messaging. Further if one production host fails, the location of any shared assets is not lost.

In one or more embodiments of the invention, the group manager (110) may in addition to, or instead of other components such as a data protection manager (not shown), a backup agent (e.g., 106) or a client (not shown), determine the preferred production host for performing of data protection such as a backup of a given asset, files and folders related to a specific application or other user defined grouping of files and folders. This may be done during the periodic discovery, or as a result of a request for sharing an asset with a requesting target device, or performing a backup as described in more detail in the method shown in FIG. 2, or at any other configured time as configured by a user, administrator, or system designer/manufacturer.

In one or more embodiments of the invention, a group manager (e.g., 110) is a physical device. The physical device may include circuitry. The physical device may be, for example, a field-programmable gate array, application specific integrated circuit, programmable processor, microcontroller, digital signal processor, or another hardware processor. The physical device may be adapted to provide the functionality of the group manager (e.g., 110) described throughout this application.

In one or more embodiments of the invention, the group manager (110) is implemented as computer instructions, e.g., computer code, stored on a persistent storage that when executed by a processor of the group (e.g., 100) including any-one-of the production hosts (e.g., 102A-102N) to provide the functionality of the group manager (e.g., 110) described throughout this application.

In one or more embodiments of the invention, the group manager (110) is implemented as a computing device (see e.g., FIG. 3). A computing device may be, for example, a mobile phone, tablet computer, laptop computer, desktop computer, server, distributed computing system, or cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device cause the computing device to perform the functionality of a group manager (e.g., 110) described throughout this application.

In one or more embodiments of the invention, the group manager (110) is implemented as a logical device. The logical device may utilize the computing resources of any number of computing devices and thereby provide the functionality of the group manager (e.g., 110) described throughout this application.

In one or other embodiments of the invention, one or more of the functions of the group manager (e.g., 110) may be performed by a data protection manager (not shown), a backup agent (e.g., 106), the individual production hosts (e.g., 102A-102N, FIG. 1A), a requesting target device (not shown), or other component of the system without departing from the invention.

Figure 1B:
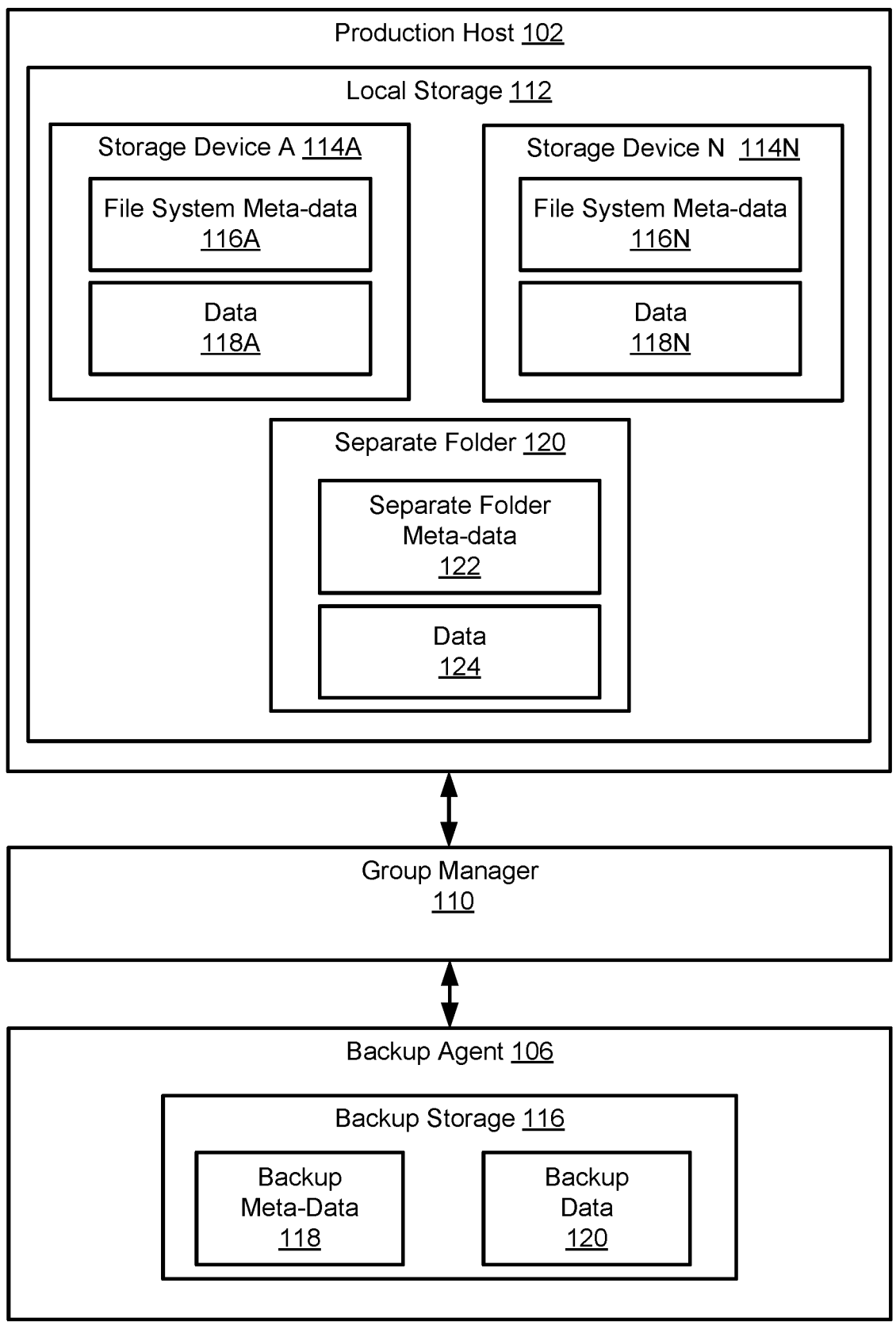
FIG. 1B shows a detailed diagram of a system for backing up and restoring files and folders in accordance with one or more embodiments of the invention.

Turning now to FIG. 1B, FIG. 1B shows a diagram of specific components utilized in performing a backup of a user defined logical asset located on at least one production host (e.g., 102) and a backup agent (e.g., 106) in accordance with one or more embodiments of the invention. The production host (e.g., 102) communicates with one or more backup agents (e.g., 106) and a group manager (e.g., 110). Each component illustrated in FIG. 1B is discussed below.

The production host (e.g., 102) may be similar to the production hosts (e.g., 102A-102N) as discussed above in reference to FIG. 1A. The production host (e.g., 102) may include VMs, a hypervisor, a production agent, and local storage (e.g., 112) that includes a plurality of storage devices (e.g., 130A-130N). The production host may include additional, fewer, and/or different components without departing from scope of the invention. Each component may be operably connected to any of the other component via any combination of wired and/or wireless connections.

As discussed above, the production host may provide computer implemented services to clients as well as the backup agent(s) (e.g., 106). To provide and obtain the aforementioned computer implemented services, the production host may include application(s) which are stored on the local storage (e.g., 112). The production host may include other and/or additional components without departing from the invention.

The production host (e.g., 102) includes storage devices, e.g., 114A and 114N. The storage devices include a file system meta-data repository (e.g., 116A, 116N) and data (e.g., 118A, 118N). A file system meta-data repository (e.g., 116N) may be one or more data structures that include information regarding application data stored in the file system repository. The information included in the file system meta-data repository (e.g., 116A, 116N) in one or more embodiments of the invention may be determined as a normal function of the file system of each storage device (e.g., 114A-114N), as part of a meta-data-based backup (MBB), or other functions requested by any of the backup agent (e.g., 106), group manager (e.g., 110) or other components of the system.

The information included in the file system meta-data repository (e.g., 116A, 116N) in one or more embodiments of the invention may be used to for determining the files and folders that are associated with an asset, producing estimates of the size of files and folders associated with the asset and/or other functions such as performing a backup as will be described in more detail with regards to the method shown in FIG. 2. The file system meta-data repository (e.g., 116A, 116N) may include other and/or additional information without departing from the invention.

The storage devices (e.g., 114A, 1114N), may include one or more data structures (e.g., 118A, 118N) that may contain the actual data associated with one or more applications. The storage devices (e.g., 114A, 114N) may include data (e.g., 118A, 118N) generated by the hosts. The data may be any type of data such as, but not limited to, database data and email data generated by applications and/or their users. Each storage device (e.g., 116A-116N) may include any number of applications and associated data as well as assets not associated with a specific application such as user defined logical assets.

Users (e.g., individuals, administrators, or their proxies) operating or using the system may use the data (e.g., 118A and 118N), stored on the storage devices (e.g., 114A and 114N), when obtaining computer implemented services from the production host (e.g., 102). Additionally, the data (e.g., 118A and 118N), stored on the storage devices (e.g., 114A and 114N) of the production host (e.g., 102), may be obtained by a backup agent (e.g., 106) or other requesting device (not shown) to perform functions. The data (e.g., 118A and 118N) of the file system storage devices (e.g., 114A and 114N), may be used by other and/or additional entities for other and/or additional purposes without departing from the invention.

In accordance with one or more embodiments of the invention, the production host (e.g., 102) may include a separate folder (120). This folder may be stored on any of the storage devices (e.g., 114A-114N) or on its own storage device (as shown). The separate folder (120) is provided to store data (124) in the form of files and folders. The separate folder (e.g., 120) also stores meta-data (e.g., 122) related to the files and folders stored as data (e.g., 124). This meta-data (e.g., 122) provides, among other things, information on where the files and folders were originally located (when the backup was performed), indications of why the files and folders are not usable, and other pertinent information.

The files and folders stored as data (e.g., 124) along with their meta-data (e.g., 122) are those files that for various reasons during a restoration could not be immediately restored. For example, if the files and folders originally (prior to the backup) had names and path lengths that are greater than 255 bytes, certain backup agents and file systems would be unable to access them. Another non-limiting example, if the files and folders have been encrypted, it may not be possible for the backup agent to properly restore them without a key. Other reasons such as permissions (or lack thereof), etc. may cause files to be placed in the separate folder (e.g., 120). The method of backing up the files and restoring them in the separate folder and/or in the storage devices (e.g., 114A-114N) is described in more detail with regards to the method shown in FIG. 2.

In one or more embodiments of the invention, a group manager (110) manages the production hosts. This may include such functions as tracking where assets and files are located on individual hosts (e.g., 102) and/or storage devices (e.g., 114A-114N) associated with the hosts (e.g., 102A-102N). A backup agent (e.g., 106) requests an asset such as files and folders related to a particular application, an entire storage device's file system, or a user defined logical asset, located on a host (e.g., 102) on one or more of its storage devices (e.g., 114A-114N). When the backup agent (e.g., 106) makes such a request, the group manager (110) utilizes the file-system meta-data (e.g., 116A-116N) located on each of the hosts (e.g., 102A-102N) to determine which files and folders are associated with the asset.

In one or more embodiments of the invention, the backup agent (e.g., 106) as described in more detail above with regards to FIG. 1A, requests the asset from the production host (e.g., 102) or through an intermediary such as the group manager (e.g., 110). The backup agent (e.g., 106) may include its own storage (e.g., 116) for storing the backup data (e.g., 120) and associated met-data for the backup (e.g., 118).

The backup agent (e.g., 106) may take the form of a physical device that may include circuitry. The physical device may be, for example, a field-programmable gate array, application specific integrated circuit, programmable processor, microcontroller, digital signal processor, or other hardware processor. The physical device may be adapted to provide the functionality of the backup agent (e.g., 106) as described throughout this application. In one or more embodiments of the invention, the backup agent (e.g., 106) is implemented as computer instructions, e.g., computer code, stored on a persistent storage that when executed by a client or user, causes a processor to provide the functionality of a backup agent (e.g., 106).

FIG. 2 shows a method of backing up and restoring files and folders in accordance with one or more embodiments of the invention. While the various steps in the method are presented and described sequentially, those skilled in the art will appreciate that some or all the steps may be executed in different orders, may be combined, or omitted, and some or all steps may be executed in a parallel manner without departing from the scope of the invention.

The method may be performed by, for example, a backup agent (e.g., 106, FIG. 1B) or alternatively by a group manager (e.g., 110, FIG. 1B), or an individual production host (e.g., 102A-102N, FIG. 1A). Other components of the system illustrated in FIGS. 1A and 1B may perform all, or a portion of the method of FIG. 2 without departing from the invention.

In step 200, a backup is initiated. The backup may be initiated by a user or administrator, or other entity such as, in a non-limiting example, a backup application. The backup may be for an entire file-system, an asset such as those files and folders related to an application, and/or a logical asset that is not specifically related to an application and is defined by a user. The backup may be a full backup or an incremental backup and may be addressed to the file-system of one production host (e.g., 102A-102N, FIG. 1A) or a plurality of backup hosts (e.g., 102A-102N, FIG. 1A).

Once the backup is initiated in step 200, the backup is performed in step 210. Meta-data (e.g., 116A-116N, FIG. 1B) for the file system is retrieved. Based on the meta-data and specifics of the initiation request, data in the form of files and folders is obtained from the storage devices (e.g., 114A-114N, FIG. 1B). The data is backed up by the backup agent (e.g., 106, FIG. 1B) or related component, and the backup data (e.g., 120, FIG. 1B) is then stored in step 220 in backup storage (e.g., 116, FIG. 1B) along with the backup meta-data (e.g., 118, FIG. 1B).

The backup meta-data (e.g., 118, FIG. 1B) may store such information as file and folder names of the original data, their original location, file type, and where they are stored in the backup data (e.g., 120, FIG. 1B). More or less information may be stored in the backup meta-data (e.g., 118, FIG. 1B) without departing from the invention.

Further, in accordance with one or more embodiments of the invention, at step 230 an indication may be added to the backup meta-data (e.g., 118, FIG. 1B). The indication indicates that a file or folder is unavailable for normal restoration. The method stores such an indication if a file or folder meets a predetermined criteria, such as, in a non-limiting example, having a file name and path, which is longer than 255 bytes. Another non-limiting example includes that a file and/or folder requires a permission that the backup-agent or user initiating the backup lacks. Other predetermined criteria including encryption, file type, etc. may cause a folder and/or file to become unavailable and be indicated in the backup meta-data (e.g., 188, FIG. 1B). The indication may be a flag or other annotation associated with the file and/or folder. Additionally, or alternatively, the name (or other data that may be used to identify the file or folder) may be stored in an indication file, where each such entry may be referred to as an indication. Any other method for identifying a file or folder that is unavailable for normal restoration may be used and any such methods may be referred to as indications.

Determining the file or folder is unavailable for normal restoration, may occur at a plurality of times, including when the backup is performed in step 210. In accordance with one or more embodiments of the invention, the determination may occur any time after the backup and backup meta-data are stored in step 220. In accordance with one or more embodiments of the invention, the backup metadata (e.g., 118, FIG. 1B) may be monitored continuously or only when a restoration is requested.

In one or more embodiments of the invention, the backup metadata (e.g., 118, FIG. 1B), is analyzed periodically to determine if it has become unavailable, this may be done at any frequency that a user, administrator, manufacture, or other concerned party deems is useful. For example, the backup meta-data (e.g., 118, FIG. 1B) may be monitored once every day, month, year, etc. The meta-data may be monitored more or less frequently depending on user preference, backup file type, and/or based on system availability. Other periods for monitoring may be used without departing from the invention.

At some point in time after the backup and backup meta-data are stored in step 220, and indications are added (or stored as the case may be) in step 230, the method proceeds to step 240 where a request for a restoration is received. The restoration may be initiated by a user or administrator, or other party such as, in a non-limiting example, a backup application. The restoration may be for all the data included in a backup or for only a specific asset, folder, or files. Once the request for a restoration is received and the restoration initiated, the backup-agent (e.g., 106, FIG. 1B) or other component of the system performing the restoration, retrieves the backup meta-data (e.g., 118, FIG. 1B) and analyzes the backup meta-data (e.g., 118, FIG. 1B) to determine which files and folders have been indicated as being unavailable for normal restoration in step 230. Those files that do not have the indication are restored as normal, which in accordance with one or more embodiments of the invention is to the location where they were original backed up from. Alternatively, in accordance with one or more embodiments of the invention, the files that do not have the indication may be restored to a new location indicated in the restoration request. For the remaining files and folders that include the indication, the method proceeds to step 240.

In step 240, those files and folders that include the indication are placed in a separate folder (e.g., 120). The separate folder (e.g., 120, FIG. 1B) may be located on one or more of the production hosts (e.g., 102A-102N, FIG. 1A), or on separate storage related to the group manager (e.g., 110, FIG. 1A) or backup agent (e.g., 106, FIG. 1A). The separate folder (e.g., 120, FIG. 1B) stores the files or folders as data (e.g., 124, FIG. 1B) along with their meta-data (e.g., 122, FIG. 1B). This met-data (e.g., 122, FIG. 1B) may include the original location, name, path of the data along with its current location in the separate folder (e.g., 120, FIG. 1B).

In one or more embodiments of the invention, once the unavailable files and folders are stored in the separate folder (e.g., 120, FIG. 1B) in step 240, the method proceeds to step 250. In step 250, a user or administrator is presented with a list, generated from the separate folder meta-data (e.g., 122, FIG. 1B), of the files and folders that are unavailable. This may be displayed in the form of graphical user interface (GUI) or in another useful form. From there the user may choose how they wish for the unavailable files and folders to be treated in step 260. This may include choosing to not restore the files and folders, restore some files and folders based on user determined rules, and/or any other instructions.

For example, in a non-limiting example, if the files are excluded due to having a path length and name longer than 255 bytes, a user may choose to have the files restored with a name that is under 255 bytes in length and related to the original name and path name. One method of doing this would be applying a hash function to the original name and path to produce a hash value, which may then be used as a new name. The meta-data for the restored file would then include an indication of what the original name and path is, so that the file would be accessible to applications and users. Another non-limiting example would be having the user provide a key or password if the file is excluded because of encryption or permissions. Other mechanisms or methods of treating the files and folders may be used, and the invention is not limited by the examples given above.

Once the instructions are received from the user, the method proceeds to step 270. Where in accordance with the instructions the files and folders are restored. In the case where the instructions are that the files are not to be restored, the files are skipped and/or purged and the restoration is complete. In one or more embodiments of the invention, steps 250 and 260 may be skipped, and predetermine rules are used in step 270 for performing the restoration of the unavailable files and folders. These predetermined rules may be selected by a user, administrator, or manufacturer prior to performing a backup or restoration and may comprise of protocols for common issues (such as file name and path length) that the backup agent (e.g., 106, FIG. 1B) automatically performs.

The method may end following step 270.

Additionally, as discussed above, embodiments of the invention may be implemented using computing devices. FIG. 3 shows a diagram of a computing device in accordance with one or more embodiments of the invention. The computing device (300) may include one or more computer processors (310), non-persistent storage (330) (e.g., volatile memory, such as random access memory (RAM), cache memory), persistent storage (340) (e.g., a hard disk, an optical drive such as a compact disk (CD) drive or digital versatile disk (DVD) drive, a flash memory, etc.), a communication interface (320) (e.g., Bluetooth interface, infrared interface, network interface, optical interface, etc.), input devices (360), output devices (350), and numerous other elements (not shown) and functionalities. Each of these components is described below.

In one embodiment of the invention, the computer processor(s) (310) may be an integrated circuit for processing instructions. For example, the computer processor(s) may be one or more cores or micro-cores of a processor. The computing device (300) may also include one or more input devices (360), such as a touchscreen, keyboard, mouse, microphone, touchpad, electronic pen, or any other type of input device. Further, the communication interface (320) may include an integrated circuit for connecting the computing device (300) to a network (not shown) (e.g., a local area network (LAN), a wide area network (WAN) such as the Internet, mobile network, or any other type of network) and/or to another device, such as another computing device.

In one embodiment of the invention, the computing device (300) may include one or more output devices (350), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (310), non-persistent storage (330), and persistent storage (340). Many distinct types of computing devices exist, and the input and output device(s) may take other forms.

One or more embodiments of the invention may be implemented using instructions executed by one or more processors of the data management device. Further, such instructions may correspond to computer readable instructions that are stored on one or more non-transitory computer readable mediums.

The one or more embodiments of the invention described above may improve the operation of one or more computing devices by allowing backups and restorations to be performed even on files and folders that are normally un-accessible. By utilizing the backup's meta-data, a backup agent may receive an indication that a file or folder is not-accessible and take appropriate actions so that the files and folders that are normally un-accessible may be properly restored. Making it possible to efficiently perform a backup of a file-system that may be restored even when files and/or folders are normally un-accessible or become un-accessible due to technology changes.

In accordance with one or more embodiments, meta-data produced during a backup is modified to include an indication for any files and/or folders that are not accessible. When it becomes time to perform a restoration, those files and/or folders that are indicated as not being accessible may be restored to a special folder. Then based on predetermined instructions or instructions received from a user or administrator, the indicated files and/or folders may be restored as instructed or skipped over as desired. This allows backups and restorations to be performed even for files and folders that may not be directly accessible by the backup-agent or by other components of the client/server architecture.

The problems discussed above should be understood as being examples of problems solved by embodiments of the invention disclosed herein and the invention should not be limited to solving the same/similar problems. The disclosed invention is applicable to address a range of problems beyond those discussed herein.

While the invention has been described with respect to a limited number of embodiments, those skilled in the art, having benefit of this disclosure, will appreciate that other embodiments may be devised which do not depart from the scope of the technology as disclosed herein. Accordingly, the scope of the invention should be limited only by the attached claims.

What is claimed is:

1. A method for performing a backup and a restoration, the method comprising:
   receiving a request for a backup;
   performing the backup;
   storing meta-data for each file and folder included in the backup;
   indicating in the meta-data if a file or folder meets a predetermined criteria that may makes the file or folder unavailable for normal restoration;
   receiving, after the indicating, a request for a restoration;
   restoring those files and folders that are not indicated as meeting the predetermined criteria;
   placing those files and folders that are indicated as meeting the predetermined criteria in a separate folder;
   receiving instructions on how to restore the files and folders that are indicated as meeting the predetermined criteria; and
   restoring the files and folders in the separate folder in accordance with the instructions that were received.

2. The method of claim 1, wherein the predetermined criteria is that the file or folder has an original name and path that is greater than 255 bytes.

3. The method of claim 2, wherein the file or folder is given a temporary name that is less than 255 bytes and a mapping between the temporary name and the original name and path is placed in meta-data stored with the files and folders in the separate folder.

4. The method of claim 3, wherein the temporary name is based on a hash value of the original name and path of the file or folder.

5. The method of claim 1, further comprising: displaying a list of the files and folders that are indicated as meeting the predetermined criteria to a user.

6. The method of claim 5, wherein, after the displaying, the user provides the instructions.

7. The method of claim 6, wherein the instructions comprise a user providing an encryption key for decrypting the files and folders.

8. The method of claim 6, wherein the instructions comprise the user providing new permissions for the files and folders.

9. The method of claim 1, wherein the instructions comprise not restoring the files and folders that meet at least some predetermined criteria that are included in the predetermined criteria.

10. A non-transitory computer readable medium comprising computer readable program code, which when executed by a computer processor enables the computer processor to perform a backup and a restoration, the method comprising:
    receiving a request for a backup;
    performing the backup;
    storing meta-data for each file and folder included in the backup;
    indicating in the meta-data if a file or folder meets a predetermined criteria that may makes the file or folder unavailable for normal restoration;
    receiving, after the indicating, a request for a restoration;
    restoring those files and folders that are not indicated as meeting the predetermined criteria;
    placing those files and folders that are indicated as meeting the predetermined criteria in a separate folder;
    receiving instructions on how to restore the files and folders that are indicated as meeting the predetermined criteria; and
    restoring the files and folders in the separate folder in accordance with the instructions that were received.

11. The non-transitory computer readable medium of claim 10, wherein the predetermined criteria is that the file or folder has an original name and path that is greater than 255 bytes.

12. The non-transitory computer readable medium of claim 11, wherein the file or folder is given a temporary name that is less than 255 bytes and a mapping between the temporary name and the original name and path is placed in meta-data stored with the files and folders in the separate folder.

13. The non-transitory computer readable medium of claim 12, wherein the temporary name is based on a hash value of the original name and path of the file or folder.

14. The non-transitory computer readable medium of claim 10, further comprising: displaying a list of the files and folders that are indicated as meeting the predetermined criteria to a user.

15. The non-transitory computer readable medium of claim 14, wherein the user provides the instructions.

16. A system comprising:
    a production host which comprises of:
      a file-system
      a processor; and
      a memory comprising instructions, which when executed by the processor, performs a method for performing a backup and a restoration comprising:
        receiving a request for a backup;
        performing the backup;
        storing meta-data for each file and folder included in the backup;
        indicating in the meta-data if a file or folder meets a predetermined criteria that may makes the file or folder unavailable for normal restoration;
        receiving, after the indicating, a request for a restoration;
        restoring those files and folders that are not indicated as meeting the predetermined criteria;

placing those files and folders that are indicated as meeting the predetermined criteria in a separate folder;

receiving instructions on how to restore the files and folders that are indicated as meeting the predetermined criteria; and restoring the files and folders in the separate folder in accordance with the instructions that were received.

17. The system of claim 16, wherein the predetermined criteria is that the file or folder has an original name and path that is greater than 255 bytes.

18. The system of claim 17, wherein the file or folder is given a temporary name that is less than 255 bytes and a mapping between the temporary name and the original name and path is placed in meta-data stored with the files and folders in the separate folder.

19. The system of claim 18, wherein the temporary name is based on a hash value of the original name and path of the file or folder.

20. The system of claim 16, further comprising:

displaying a list of the files and folders that are indicated as meeting the predetermined criteria to a user; and after the displaying, the user provides the instructions.

* * * * *